United States Patent [19]

Mandy et al.

[11] 3,827,481
[45] Aug. 6, 1974

[54] DISTRIBUTOR FOR GEL-LIKE MATERIALS

[75] Inventors: Zoltan P. Mandy, Camillus; George Akerhielm, Manilus; David Tulowiecki, Liverpool, all of N.Y.

[73] Assignee: Carrier Corporation, Syracuse, N.Y.

[22] Filed: May 1, 1973

[21] Appl. No.: 356,258

[52] U.S. Cl.............. 165/118, 165/174, 159/13 A, 239/193
[51] Int. Cl........................................... F28f 25/00
[58] Field of Search................... 165/115, 118, 174; 159/13 A; 239/193, 194; 261/112

[56] References Cited
UNITED STATES PATENTS
780,096    1/1905    Geppert.......................... 165/118 X
1,631,162  6/1927    Sebald............................ 165/115 X
3,364,982  1/1968    Jaffe ............................... 165/115 X Primary Examiner—Albert W. Davis, Jr.
Attorney, Agent, or Firm—J. Raymond Curtin; D. Peter Hochberg

[57] ABSTRACT

Apparatus for distributing a gel-like material such as sludge to the entrances of a plurality of vertically extending conduits such as falling film heat exchange tubes used in a freeze-thaw sludge treatment system. The apparatus comprises a plate having a set of orifices for receiving the upper ends of the conduits, there being slight clearance between the orifice edge and the conduit. The gel-like material is introduced beneath the distributor plate under pressure, and the material flows upwardly through the clearance and into the upper ends of the conduits in a uniform manner.

3 Claims, 3 Drawing Figures

3,827,481

DISTRIBUTOR FOR GEL-LIKE MATERIALS

BACKGROUND OF THE INVENTION

1. Field of the Invention

The present invention relates to the distribution of gel-like materials to a plurality of vertically extending conduits, and more particularly to the distribution of sludge to the falling film heat exchange tubes used in a freeze-thaw sludge treatment system.

2. Description of the Prior Art

Commonly assigned, copending United States patent application Ser. No. 231,274, which was filed on Mar. 2, 1972, in the name of Neyhart et al and entitled "Sludge Separation Systems," discloses a sludge treatment system for sequentially freezing and then thawing sludge to separate the sludge into concentrated and dilute portions. The system employs a reversible refrigeration circuit having a pair of falling film heat exchangers which serve alternate and opposite functions as evaporators and as condensers for freezing raw sludge and for melting previously frozen sludge, respectively. The refrigeration cycle is reversible, and reversal of the refrigerant flow is effected at appropriate times to switch the roles of the two heat exchangers.

The heat exchangers are substantially identical, and each heat exchanger includes a set of vertical heat exchange tubes disposed in a vertical, cylindrical shell. The tubes are adapted to receive unfrozen sludge at their upper ends and to discharge sludge from their lower ends. The upper ends of the tubes are held in place by a tube sheet to which the tubes are secured, the tube sheet forming the base of an upper header to which unfrozen sludge is fed by a pump. In systems of the foregoing type, sludge can be introduced to the upper header in a flow stream tangential with the cylindrical wall of the header, whereby the sludge flows along the periphery of the wall and around and into the various heat exchange tubes. In order to improve the distribution of sludge to the tubes, the preceding application discloses the incorporation of an apertured, annular distributor disposed between the outer wall of the upper header and the heat exchange tubes. Similarly, the latter application further teaches the provision of V-notches in the upper ends of the heat exchange tubes for improving the uniform flow of sludge down the respective tubes.

The foregoing means for improving the distribution of sludge to the heat exchange tubes has proven satisfactory for its intended application. However, gel-like materials, such as sludge chilled to temperatures near the freezing point, can pose problems impeding the uniform distribution of the material to a plurality of conduits. For example, sludge introduced to an upper header in a direction tangential to the cylindrical wall of the header can form localized areas within the header of low or zero velocity. Such stagnant areas can substantially reduce the amount of sludge fed to individual tubes, and can cause the nonuniform feeding of sludge down the interior walls of particular tubes. The net result of such an occurrence is to increase the power requirements of the system, to cause some tubes to fill completely with ice (whereas it is desired to maintain a hollow core therein), and to reduce the freezing rate of the sludge.

SUMMARY OF THE INVENTION

An object of the present invention is to distribute a gel-like material evenly among a set of vertically extending conduits, and uniformly into each of the conduits.

Another object is to distribute sludge evenly among a set of falling film heat exchange tubes, and to assure the uniform feeding of sludge to the inner walls of the individual heat exchange tubes.

A further object of the invention is to improve the efficiency of a falling film heat exchanger used in the freeze-thaw treatment of sludge.

Other objects will be apparent from the description to follow and from the appended claims.

The foregoing objects are achieved according to a preferred embodiment of the invention by the provision of a distributor plate in each of the upper headers of a pair of reversible falling film heat exchangers incorporated in a freeze-thaw sludge treatment system. In each heat exchanger, there is provided a set of vertically extending heat exchange tubes disposed in a vertical, cylindrical shell, the upper ends of the tubes being held in place by a tube sheet which is perpendicular to the tubes. The tube sheet is connected at its outer edge to the shell and is connected to the tubes in a fluid sealing manner. A sludge inlet is disposed above and adjacent to the tube sheet, and a distributor plate is located above the sludge inlet and parallel to the tube sheet. The distributor plate includes a set of orifices for receiving centrally the upper ends of the tubes, there being a slight clearance between the edge of each orifice and the tube received therein. Sludge is introduced between the tube sheet and the distributor plate under pressure, and the sludge flows upwardly through the clearances between the edges of the orifices and the tubes. By virtue of the foregoing arrangement, the sludge is distributed equally among the tubes and uniformly into the individual tubes.

DESCRIPTION OF THE PREFERRED EMBODIMENT

The present invention finds utility in the distribution of gel-like materials in a variety of situations, and it finds particular utility in the distribution of sludge to heat exchange tubes incorporated in sludge treatment systems of the type disclosed in previously cited U.S. Ser. No. 231,274, and in U.S. Ser. Nos. (O.I. 150-172, 557-1-1) and (O.I. 40-72, 553-1-1) filed in the names of Raineri et al. and Styron et al., respectively, on even date herewith. The systems disclosed in these patent applications each include a reversible refrigeration circuit including a pair of falling film heat exchangers which serve alternate and opposite functions as evaporators and as condensers, a compressor, and various refrigerant lines and valves. A sludge network operatively associated with the refrigeration circuit circulates raw sludge through the heat exchanger serving as the evaporator to freeze the raw sludge therein, while sludge previously frozen in the other heat exchanger (i.e. the condenser) melts. According to the present invention, distributor plates are incorporated in the upper headers of the two heat exchangers above both the tube sheet which maintains the heat exchange tubes in place and the sludge inlet through which raw or melted sludge is introduced to the upper header for introduction to the tubes, for providing for the equal distribution of sludge to the various tubes in the heat exchanger and for the uniform flow of sludge into the individual tubes. The distributor plates each lie in a plane parallel to the tube sheet and perpendicular to the tubes, and include orifices for centrally receiving the upper ends of the heat exchange tubes with a slight clearance between the orifice edge and the tubes. The sludge is introduced beneath the distributor plate under pressure so that it is forced upwardly through the foregoing clearances into the individual tubes in the desired fashion.

Figure 1:
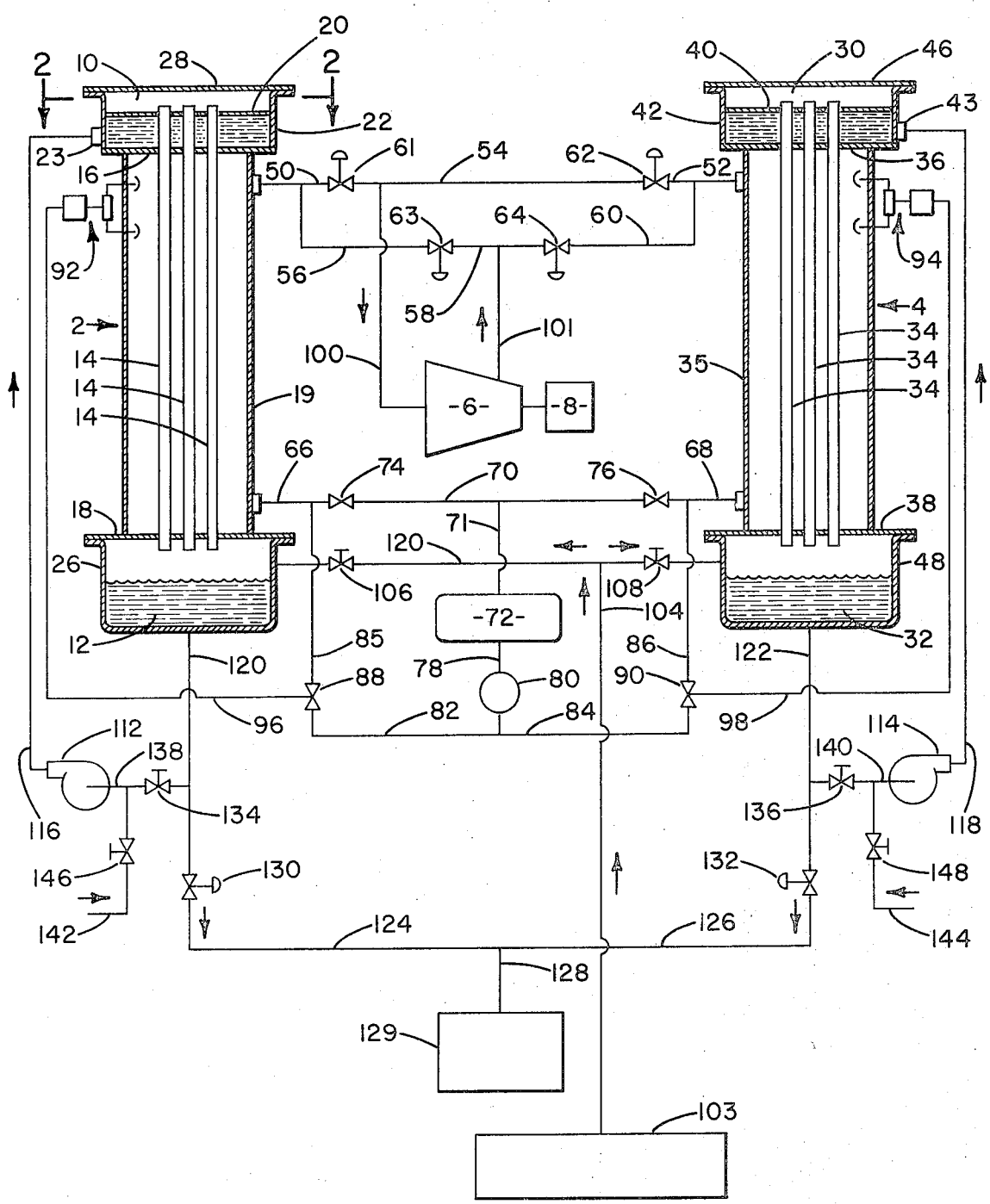
FIG. 1 shows in schematic form a freeze-thaw sludge treatment system with which the present invention can be used.

Referring now to FIG. 1, a sludge separation apparatus is shown which includes a first heat exchanger 2, a second heat exchanger 4 and a refrigerant compressor 6 driven by a motor 8. First heat exchanger 2 is provided with an upper header 10 and a lower header 12 communicating with the open ends of a plurality of vertically disposed heat exchange tubes 14 secured in an upper tube sheet 16 and a lower tube sheet 18. Tubes 14 extend along the length of an outer shell 19 located between headers 10 and 12. A circular distributor plate 20, described in detail below, is attached to the inner wall of a cylindrical outer shell 22 of upper header 10 and perpendicular thereto. Distributor plate 20 is positioned above a sludge inlet 23 to header 10, and is adapted to supply fluid sludge to the upper ends of heat exchange tubes 14.

A bottom shell 26 forms the lower header which comprises a sludge tank in cooperation with lower tube sheet 18. While it is necessary for the interior or shell side of heat exchanger 2 to be sealed from communication with the atmosphere, it is not necessary that upper and lower headers 10 and 12 be completely sealed. It is preferred to provide a removable cover plate 28 to enclose upper header 10 and similarly bottom shell 26 may be bolted to tube sheet 18 to make it easily removable for cleaning.

Heat exchanger 4 is identical in construction to heat exchanger 2 and comprises an upper header 30, a lower header 32 both communicating with a plurality of heat exchange tubes 34 which run along the length of a cylindrical shell 35 and are secured to an upper tube sheet 36 and lower tube sheet 38. A circular distributor plate 40, identical to distributor plate 20, is attached to the interior of an outer shell 42 of upper header 30 above an inlet 43 to the shell. Distributor plate 40 distributes fluid sludge to the open upper ends of heat exchange tubes 34. A cover plate 46 is provided to close upper header 30 and a bottom shell 48 is provided to form lower header 32.

Heat exchangers 2 and 4 are part of a reversible refrigeration system in which R-12 or other suitable refrigerant circulates. Lines 50 and 52 which extend from the heat exchangers are connected by refrigerant line 54 and by lines 56, 58 and 60. Flow through line 54 is controlled by valves 61 and 62, and flow through lines 56, 58 and 60 is controlled by valves 63 and 64. The operation of these valves can be controlled in many ways, such as by one or more differential pressure switches, sludge temperature switches, or manually. When valves 61, 62, 63 and 64 are open, heat exchangers 2 and 4 are in direct communication, and refrigerant vapor can pass from one exchanger to the other.

Similarly, heat exchangers 2 and 4 are connected by lines which transport condensed refrigerant from one heat exchanger to the other. Lines 66 and 68 lead from heat exchangers 2 and 4, respectively, and these lines are connected to a line 70 which has a branch 71 leading to a receiver 72. Refrigerant flow through lines 66 and 68 is controlled by valves 74 and 76, respectively. Refrigerant is pumped from receiver 72 through a line 78 by a refrigerant pump 80 to either line 82 or line 84, which lead to lines 66 and 68, respectively, via lines 85 and 86. Flow through the latter lines is controlled by valves 88 and 90, respectively which are in turn operated by level controls 92 and 94 at the top of respective heat exchangers 2 and 4. Level controls 92 and 94 are connected to the valves they control by pneumatic connections 96 and 98. During operation, one of valves 74 and 76 is open while the other is closed, to permit refrigerant to flow from one heat exchanger through pump 80 to receiver 72, from whence it is pumped to the other heat exchanger. Condensed refrigerant flow can also be effected between the exchangers through the flow path defined by lines 66, 85, 82, 84, 86 and 68, which can be opened or closed through operation of valves 88 and 90.

When refrigerant vapor is not forced from one heat exchanger to the other by virtue of a pressure differential in the refrigerant, compressor 6 is operated to withdraw refrigerant vapor from one heat exchanger for delivery to the other. For this purpose, line 100 leads from line 54 to the compressor, and line 101 leads from the compressor to line 58. Flow through line 54 is controlled by valves 61 and 62.

Raw sludge from a raw sludge tank 103 enters the system at inlet 104, and depending on which of valves 106 and 108 is open, passes through line 120 into lower header 12 or 32. Pumps 112 and 114 pump sludge from the lower headers through lines 116 and 118 to the respective upper headers. Processed sludge is discharged from the lower headers through lines 120 and 122 which join lines 124 and 126 leading to outlet 128 which delivers the material to a melted sludge tank 129. Flow through lines 120 and 122 is controlled by valves 130 and 132 respectively. Processed sludge can be recirculated through the exchangers or bypassed from the discharge lines through valves 134 and 136, into respective lines 138 and 140. Supplemental raw sludge inlet lines are provided at 142 and 144 having valves 146 and 148.

The foregoing system is reversible, and its operation will be considered at the end of a portion of its cycle in which heat exchanger 2 has been evaporating refrigerant and the refrigerant vapors have been discharged to heat exchanger 4 for condensation. Assuming the system has been proceeding through its normal operating cycle, heat exchange tubes 14 in exchanger 2 are substantially filled with frozen sludge and tubes 34 are empty, having discharged melting sludge to lower header 32. Valves 61 and 64 are open, valves 62 and 63 are closed, and compressor 6 is running; valves 76 and 88 are open; valve 134 is open and pump 112 is running; and all other valves are closed and all other pumps are shut down. The direction of refrigerant flow and the functions of the heat exchangers are about to be reversed.

At this time, valves 61, 62, 63 and 64 are opened, and compressor motor 8 is turned off. Valve 74 is opened to drain condensed refrigerant from heat exchanger 2 into receiver 72, pump 80 is actuated, and level control 94 generates a signal in response to the low level of refrigerant in heat exchanger 4 which effects the opening of valve 90. Sludge pump 112 is deactivated and valve 134 is shut, while sludge pump 114 is turned on and valve 136 is opened to circulate sludge through heat exchanger 4. The sludge is distributed by distributor plate 40 so that it flows into the upper ends of tubes 34 and flows downwardly in a relatively thin film along the interior surfaces of the tubes. Refrigerant evaporating at the exterior surface of heat exchange tubes 34 causes a portion of the sludge to freeze as a cylindrical tube on the interior surface of tubes 34. Unfrozen sludge drains through line 122 and is recirculated through pump 114.

Raw liquid sludge circulating through tubes 34 has a temperature of approximately 70° F–80° F, and it acts to evaporate the liquid refrigerant in heat exchanger 4. The vaporizing R-12 refrigerant attains an approximate pressure of 90 psia under these conditions, and it is driven through parallel lines 52, 54, 50 and 52, 60, 58, 56 and 50 into heat exchanger 2. The frozen sludge in tubes 14 could be expected to have an intial temperature of 25° F, so that heat is absorbed from the incoming refrigerant vapor. This transfer of heat causes the vapor to condense on the outer walls of tubes 14 and on the inner wall of shell 19 at an approximate temperature of 28° F and at an approximate condensing pressure of 41 psia. The pressure differential between the heat exchangers is thus 49 psia, which is sufficient to drive vapor to heat exchanger 2 at a high rate of flow.

As the foregoing refrigerant flow progresses, the temperature of the sludge in tubes 34 of heat exchanger 4 drops rapidly along with an according pressure drop of the refrigerant inside heat exchanger 4. Similarly, the temperature inside tubes 14 of heat exchanger 2 rises by virtue of the heat transferred from the condensing refrigerant, and when the tube temperature reaches 32° F, the frozen sludge begins to melt. When the cylinders of melting sludge drop into lower header 12 below heat exchanger 2, pump 112 is actuated and valve 134 is opened, whereby melted sludge is recirculated through the heat exchanger.

Shortly after the commencement of this phase of the refrigeration cycle, the temperature of sludge inside tubes 34 of heat exchanger 4 drops to about 40° F, and the temperature of the evaporating vapor drops to about 35° F with a pressure of about 47 psia. Since the pressure of the condensing refrigerant in heat exchanger 2 remains fairly constant, it is apparent that in a brief time the refrigerant pressures in the two heat exchangers become equal. At this point it is necessary to start compressor motor 8 to operate compressor 6, in order to continue circulation of the refrigerant.

Upon actuation of compressor 6, valves 61 and 64 are closed, valve 62 remains open to permit the passage of refrigerant vapor from heat exchanger 4 to enter compressor 6, and valve 63 is open to feed hot compressor discharge gas from compressor 6 into heat exchanger 2. Valves 74 and 90 also remain open to pass condensed refrigerant from heat exchanger 2 into heat exchanger 4. This second stage of the present phase of the refrigeration cycle continues with compressor 6 feeding the pressurized refrigerant vapor received from the heat exchanger which has been acting as an evaporator into the other heat exchanger which is acting as a condenser. When substantially all of the sludge in tubes 34 in the evaporating heat exchanger 4 has frozen, compressor 6 and pump 114 are turned off; valve 136 is closed; valve 130 is opened to drain melted sludge from lower header 12; and the cycle is reversed.

A charge of raw sludge is delivered through valve 106 to lower header 12 after closing valve 130. As the cycle proceeds, heat exchanger 2 now acts as an evaporator and heat exchanger 4 acts as a condenser, and the sludge previously frozen in the tubes 34 drops into lower header 32 while sludge fed into tubes 14 is frozen. During the first stage of the reversed phase of the cycle, valves 61, 62, 63, 64, 76 and 88 are open, while the other valves of the refrigeration system are closed. Likewise, sludge line valve 134 is open and pump 112 is running to circulate sludge through heat exchanger 2. At the termination of the first stage of the new cycle, compressor 6 is again actuated, and valves 62 and 63 are closed.

After the sludge is completely melted from heat exchange tubes 34, compressor 6 and pump 114 are stopped; valve 136 is closed; and valve 132 is opened. The now liquid, previously frozen, sludge passes through valve 132 and sludge passages 126 and 128 to a melted sludge tank serving as a settling tank or to some other suitable location to permit the rapid separation of suspended solid matter from the liquid vehicle.

At this time, both the refrigeration cycle and the sludge feed cycle are reversed. Heat exchanger 2 acts as the condenser and heat exchanger 4 becomes the evaporator. A charge of raw sludge is fed through valve 108 to lower header 32. Valve 132 is closed, valve 136 is opened, and pump 114 is actuated. Pump 112 is turned off and valve 134 is closed, so that when valve 130 is opened the treated sludge can be discharged to the melted sludge tank. The cycle proceeds as described above, going through a first stage when the compressor is shut down and a second stage when the compressor is operating, with sludge flow and cycle reversal occurring in proper sequence.

Additional cooling medium in the form of sludge, or preferably the separated liquid constituent thereof, may be supplied from a suitable location, such as a settling tank for previously frozen sludge, to the system through passages 142 or 144 and valves 146 or 148 in order to provide a cooling medium having additional cooling capacity to the condenser or to provide the entire cooling medium in the event that frozen sludge is not available or desired in the heat exchange tubes.

Figure 2:
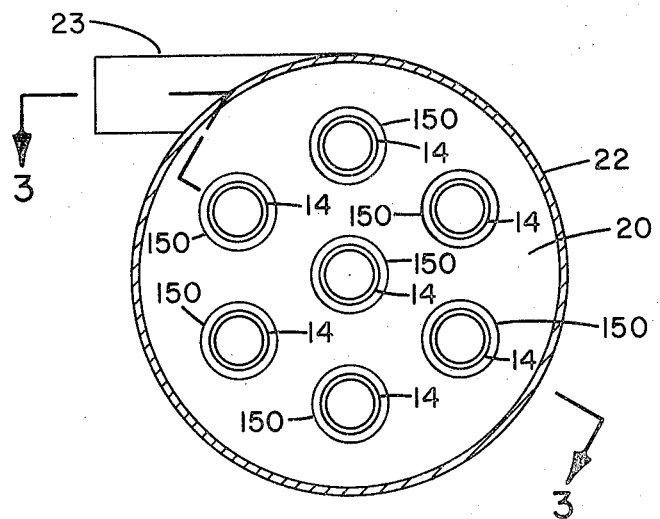
FIG. 2 is a section taken through the line 2—2 in FIG. 1.
Figure 3:
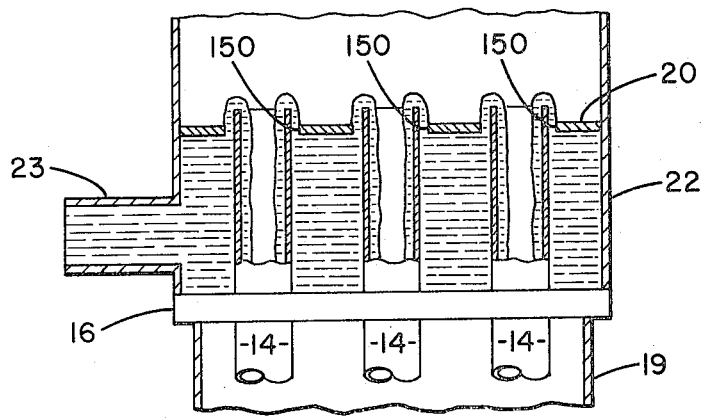
FIG. 3 is a section taken through the line 3—3 in FIG. 2.

The function of distributor plates 20 and 40 is to distribute fluid sludge evenly among the heat exchange tubes in the two heat exchangers, and to assure the uniform flow of sludge into the individual heat exchange tubes. The details of distributor plate 20 are indicated in FIGS. 2 and 3, and a similar arrangement exists for distributor plate 40 in heat exchanger 4. The latter figures indicate that heat exchange tubes 14 which extend along the length of heat exchanger 2, are held in place at the upper portion of heat exchanger 2 by tube sheet 16. Sludge enters upper header 10 through inlet 23 which is disposed above tube sheet 16. Tube sheet 16 is in a fluid sealing arrangement with shell 22 and with tubes 14, and it is able to support sludge received through inlet 23. Distributor plate 20 is attached at its outer periphery to shell 22 in a fluid sealing manner so that the sludge is unable to flow between the distributor plate and the shell wall. A set of orifices defined by surfaces 150 are provided in distributor plate 20 for receiving centrally the upper end portions of each of tubes 14. The diameters of orifices 150 are slightly larger than the outer diameters of the tubes 14, so that a slight clearance (a clearance of from 1/16 inch to ¼ inch has proven satisfactory for alum sludge) is provided between the tubes and the orifices in which they are located.

Fluid sludge is pumped to the upper header by pump 112 and it enters the header under pressure. By virtue of the fluidity of the sludge and the pressure exerted thereon, it flows upwardly through each of the clearances between the tubes 14 and surfaces 150. The flow is equal among each of the clearances, and uniform through the individual clearances. The open ends of tubes 14 are disposed in close proximity to the upper surface of plate 20, so that the fluid sludge flows evenly and uniformly into the tubes. Therefore, by virtue of the functioning of plate 20, sludge feeds evenly down the tubes to be frozen thereon. The flow is continuous so long as there is sufficient sludge beneath distributor plate 20 and pressure is maintained thereunder.

From the preceding description, it is clear that the various objects set forth above have been fully achieved. The distributor plate provided by this invention is easy to manufacture and assemble, and is highly effective in operation. Although its use has been described with regard to a sludge treatment system, it finds utility with other systems which distribute gel-like materials. The gel-like as used herein is intended to cover gels and thixotropic materials, as well as the sludge described above.

The invention has been described in detail with particular reference to a preferred embodiment thereof, but it will be understood that variations and modifications can be effected within the spirit and scope of the invention.

We claim:

1. Apparatus for distributing a gel-like material to the open upper ends of a plurality of vertically extending conduits located within an outer housing, said apparatus comprising:

a distributor plate having a plurality of orifices, each of said orifices receiving one of the conduits from beneath said plate with a predetermined clearance; and means for introducing the gel-like material under pressure beneath the plate to cause the gel-like material to flow through said predetermined clearances and into the open upper ends of the conduits.

2. Apparatus according to claim 1 and further comprising a second plate disposed beneath said distributor plate, said second plate maintaining said conduits in place and structured to hold gel-like material between said second plate and said distributor plate, and said means for introducing the gel-like material having an inlet disposed between said second plate and said distributor plate.

3. The invention according to claim 1 wherein the gel-like material is sludge, and the vertically extending conduits are falling film heat exchange tubes.

* * * * *